United States Patent
Muñoz De Juan

(10) Patent No.: US 8,313,322 B2
(45) Date of Patent: Nov. 20, 2012

(54) EQUIPMENT AND METHOD FOR PRODUCTION OF TUBES OF MOLECULARLY BIDIRECTED PLASTIC

(75) Inventor: Ignacio Muñoz De Juan, Rivas Vaciamadrid (ES)

(73) Assignee: Molecor Tecnología S.L., Rovas Vaciamadrid (ES)

( * ) Notice: Subject to any disclaimer, the term of this patent is extended or adjusted under 35 U.S.C. 154(b) by 306 days.

(21) Appl. No.: 12/668,526

(22) PCT Filed: Jul. 13, 2007

(86) PCT No.: PCT/ES2007/070131
§ 371 (c)(1),
(2), (4) Date: Feb. 25, 2010

(87) PCT Pub. No.: WO2009/010603
PCT Pub. Date: Jan. 22, 2009

(65) Prior Publication Data
US 2010/0194002 A1    Aug. 5, 2010

(51) Int. Cl.
*B29C 49/64* (2006.01)
(52) U.S. Cl. .................. 425/526; 425/535; 264/528
(58) Field of Classification Search .................. None
See application file for complete search history.

(56) References Cited

U.S. PATENT DOCUMENTS

| | | |
|---|---|---|
| 4,340,344 A | 7/1982 | Aston et al. |
| 4,530,811 A | 7/1985 | Jakobsen et al. |
| 4,699,585 A * | 10/1987 | Giese et al. ............. 425/522 |
| 5,128,091 A * | 7/1992 | Agur et al. ............. 264/512 |
| 6,099,285 A | 8/2000 | Kurihara et al. |
| 6,447,710 B1 | 9/2002 | Prevotat et al. |

FOREIGN PATENT DOCUMENTS

| | | |
|---|---|---|
| EP | 1044783 A1 | 10/2000 |
| EP | 1044783 B1 | 8/2002 |
| GB | 1 590 612 | 6/1981 |
| JP | 6174093 | 6/1994 |
| JP | 9136325 | 5/1997 |
| WO | WO 90/14208 | 11/1990 |
| WO | WO 98/13190 | 4/1998 |
| WO | WO 98/56567 | 12/1998 |

OTHER PUBLICATIONS

International Search Report of PCT/ES2007/070131 (WO2009/010603) mailed Nov. 5, 2007.
Written Opinion of PCT/ES2007/070131 mailed Nov. 5, 2007 (*with translation*).
International Preliminary Examination Report of PCT/ES2007/070131 completion date Aug. 28, 2009 (*with translation*).

* cited by examiner

*Primary Examiner* — Monica A Huson
(74) *Attorney, Agent, or Firm* — Merchant & Gould P.C.

(57) ABSTRACT

The apparatus is constituted from a mold (1, 17, 14) formed by a central body (14) and a first head (1) and a second head (17) connected on opposite sides of the central body (14), as well as it having a rigid and perforated guide (5), which is axially centered inside the mold (1, 17, 14) whereon the blank pipe (10) is coupled longitudinally. This guide is provided with orifices (9) for the passage therethrough of an expansion fluid (18) which causes the expansion of the blank pipe (10) against the inner walls of the mold (1, 17, 14) without any heat exchange between the blank pipe (10) and the mold (1, 17, 14).

4 Claims, 2 Drawing Sheets

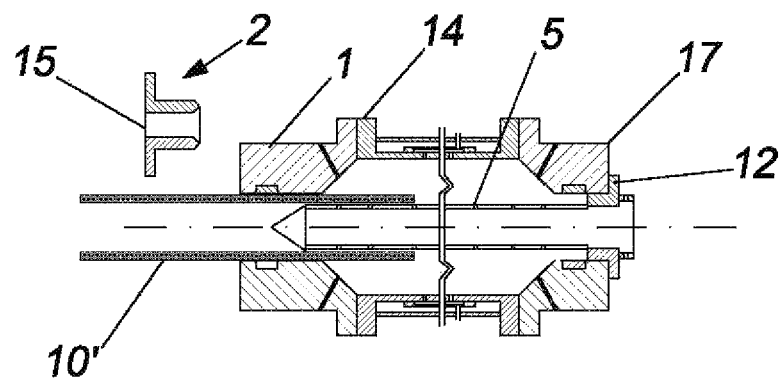
FIG. 2.1
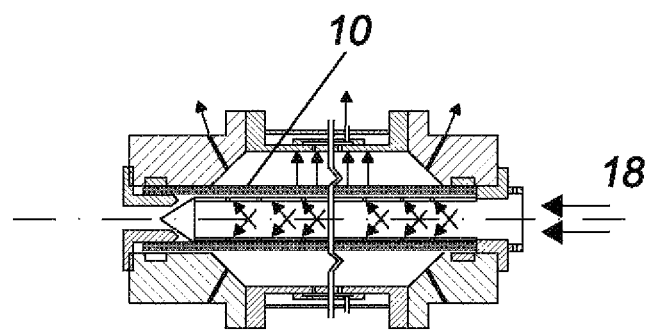
FIG. 2.2
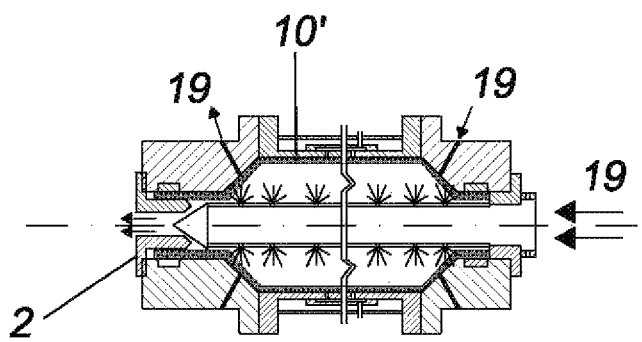
FIG. 2.3
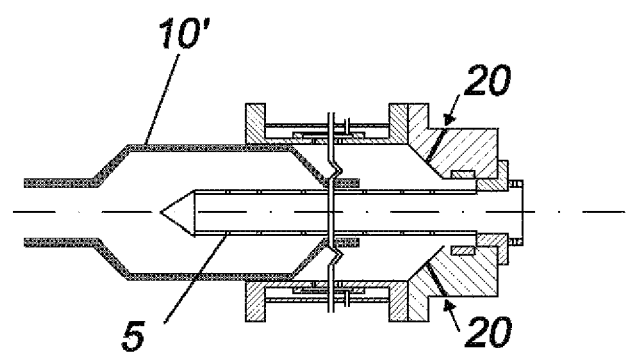
FIG. 2.4

EQUIPMENT AND METHOD FOR PRODUCTION OF TUBES OF MOLECULARLY BIDIRECTED PLASTIC

This application is a National Stage Application of PCT/ES2007/070131, filed 13 Jul. 2007, and which application is incorporated herein by reference. To the extent appropriate, a claim of priority is made to the above disclosed application.

OBJECT OF THE INVENTION

The field of application of the invention is included within the manufacturing processes of tubular profiles or molecularly oriented plastic pipes and, in particular, of discontinuous or "in-batch" systems.

The present invention relates to an apparatus and to the method corresponding to the manufacturing of molecularly oriented plastic pipes, in particular for its application in the manufacturing of pipes, signalling elements and light structural elements.

The object of the invention consists of forming plastic pipes with molecular orientation in a simply executed process, quickly and energy efficient, even by means of gases as a whole, which makes it possible to reduce costs and time in the production of the plastic pipes, as well as reducing the cost of apparatus necessary so that the final product will reach the market at a much more competitive price using the apparatus and the manufacturing method of this invention.

The apparatus is based on an especially designed mould, which incorporates a series of accessories both internally and externally, an expansion system, a cooling system and another vacuum system, conveniently synchronized to enable the execution of the corresponding method for the production of a molecularly bi-oriented pipe or profile.

BACKGROUND OF THE INVENTION

Bimolecular orientation is a process whereby, applying a mechanical deformation to a pipe or blank previously extruded in suitable conditions of temperature, pressure, deformation speed and deformation radius principally, a substantial modification of its mechanical properties occurs, principally the sigma (or stress) of the material, resistance to impact, creep improvement, crack propagation resistance, improvement of Young's module, etc.

With said molecular orientation process, an ultraresistant pipe is produced, with less raw material and with identical or superior features, thanks to the better resistance of the material.

To reinforce the pipe tangentially, which is in the direction where it is intended to reinforce the material to withstand pressure, the previously extruded pipe should be expanded radially, thereby increasing its diameter considerably.

There are various systems for the manufacturing of tubular profiles, which can be grouped in two large categories: Continuous or line systems and discontinuous or "in-batch" systems Bearing in mind that the apparatus and method of the invention is included in the category of the second system stated, allusion will mainly be made to discontinuous or "in-batch" systems which consist of processes which produce molecular orientation "element by element" based on an expansion of the tubular blank within a mould which provides the definitive form of the tubular profile.

There are numerous patents and documents which disclose variants of this system or method, it being possible to cite:

Method based on patent of invention WO98/13190. The hot pipe is secured at the ends of the mould within a tightened sleeve subjected to internal pressure to, in a first phase, adhere the pipe against the sleeve walls, which is a temperature similar to the orientation temperature, and then, and in a second phase, remove the sleeve by axial sliding, so that the plastic pipe expands radially and adhering to the walls of the mould, which is cold, achieving the cooling of the pipe by contact with said cold mould.

The main characteristics of said method consist of the mould being composed of two concentric bodies which slide one within the other, performing the expansion in two phases and producing the cooling by contact with the mould walls.

Method based on patent of invention U.S. Pat. No. 4,340,344 where the pipe is introduced in a symmetrical mould, it is heated to pass hot water inside and outside the plastic blank and, when orientation temperature is reached, the inner pressure increases and the blank expands on the mould.

The pipe is cooled as in the previous case by contact with the mould, when it is expanded, i.e. externally and indirectly, with the special feature that the mould has been heated first with water used to heat the plastic pipe and then the mould is cooled to cool the plastic pipe, which determines a very poor energy efficiency of the general process.

The first method is carried out by moulds formed by systems with actuations and internal mechanisms of certain complexity, so that in its normal functioning and due to the fact that they are concentric and are displaced axially, they reach double their length, an expensive system being necessary with a great need for space. Likewise, the inner sleeve which supports the blank plastic pipe in first instance should be hot, for which reason it is necessary that it permits the recirculation of the tempering hot fluid or a system of electric resistances and their connections, further complicating the mould.

Likewise, said mould is always kept cold thanks to an external bath of cooling fluid, whilst the cooling of the already formed plastic pipe occurs indirectly through this mould and by contact, which gives an energy inefficient system, and disadvantageous as regards processing time, since as the plastic has a dilatation coefficient greater than that of metal, a contraction occurs almost immediately and, therefore, the separation between the mould and the plastic, enormously hindering the transmission of heat by contact. The expansion occurs in at least two phases, being a slow process which is subordinate to the displacement of the moving sleeve.

In the same manner, the heat efficiency is worsened in the second method, since the mould is heated and cooled each time a pipe is processed, which involves a high energy cost, determining a low efficiency as in the previous case, since again the cooling occurs by contact. In this method, the pipe is introduced cold, the mould serving as heater and as mould in itself, having numerous orifices to permit the evacuation of the fluid which has previously served to heat the pipe, thus making the execution of the mould more expensive.

Patent of invention WO 98/56567 discloses an oriented plastic pipe manufacturing process which consists of a means of securing of the tubular blank, and it has an evacuation system by micropores of a fluid which heats the tubular blank, the mould having an intermediate sleeve with purposes of heating and subsequent cooling of the pipe mould.

A process of producing tubular premouldings of a thermoplastic material suitable for shaping to form containers by rolling process is disclosed in the U.S. Pat. No. 4,530,811, wherein the material is a part of a tube is axially oriented as a result of reducing the wall thickness by applying an external pressure which causes the material to flow.

Japanese patent JP9136325 discloses a system and method to control the temperature of a mould for blow moulding, the system is based in the introduction of vacuum in chamber external to the mould which is connected to the inner chamber using aerators. The mould is further cooled down by introducing cooling water in said external chamber.

U.S. Pat. No. 6,099,285 describes a process and apparatus for moulding, in which a molten thermoplastic resin is fitting onto a moulding surface of a mould under a certain pressure and it's then cured to obtain a moulded product.

DESCRIPTION OF THE INVENTION

The apparatus and method of production of plastic pipes which constitutes the object of the invention makes it possible to resolve the problems and drawbacks stated in the previous section, permitting a molecular orientation simply, quickly and which is energy efficient, the apparatus being much less sophisticated and expensive than the conventional ones, which makes it possible to reduce the costs and processing times significantly at the same time as the cost of the necessary equipment, making it possible that these products reach the market at a much more competitive price.

Likewise, it is necessary to highlight that this apparatus offers as main advantage the fact that it permits the production of the pipe without the need to use liquids, since it is preferably devised for gaseous fluids.

More specifically, the apparatus of the invention comprises a special mould for the forming of a plastic pipe or tubular profile, a mould which acts only as a former and at a constant temperature, and with the possibility of avoiding heat exchange between said mould and the plastic pipe, since the pipe can be exclusively cooled through the inside. Said mould, unlike the first system described in the previous section, lacks sliding mechanisms or accessories.

The mould is constantly tempered with external heating or cooling elements connected thereto by means of pipes. The mould includes separate end heads coupled to the central body, which fix the plastic pipe when it enters the mould, hereinafter called blank pipe and, by its displacement, enable the extraction of the already treated pipe, hereinafter called oriented pipe.

Each one of these heads may have separate openings of different diameters in opposite surfaces, so that the opening of less diameter permits the guided entry of the blank pipe towards the mould in one direction, and the large opening, once the oriented pipe is formed and after displacement of the head in the opposite direction, permits the extraction of the oriented pipe. This characteristic of double opening permits that the intake of the blank pipe and the outlet of the oriented pipe occur with great speed, considerably facilitating the handling process.

Said heads also include an inlet used to make the vacuum which permits, before forming, to expand the blank pipe, and facilitate the lubrication by air cushion or any other fluid, enabling the gentle and very fast extraction of the formed pipes without the need for strong mechanical elements. The mould has a significant reduction in inlets or orifices in relation to other systems which use a liquid such as expansion fluid wherein there are a multiplicity of orifices throughout the mould designed to facilitate the evacuation of the liquid which may be confined to the wall of the formed pipe.

One of the most significant aspects of the invention relates to the inclusion, within the mould and fixed to one of the heads, of a rigid perforated guide, preferably of length slightly less than the total length of the mould, axially centred, so that it performs the dual mission of:

a) serving as support for the blank pipe and avoiding that it touches the walls of the mould during its introduction and that a displacement and a bad securing thereof occurs, and b) permitting a determined distribution of the flow capacity which should serve both for the expansion and for the internal cooling of the pipe during its forming. This guide can also be tempered at a desired temperature.

Furthermore, in the mould, and specifically in the heads, mechanical means of securing of the blank pipe and means for the intake and outlet of expansion/cooling fluid, as well as pipe presence detectors and other elements which facilitate the process, have been provided.

The mould may have small orifices which allow the dual effect of externally cooling the pipe already oriented with an air sheet which circulates between the oriented pipe and the mould, thus facilitating the extraction of the oriented pipe. These orifices are positioned in the central body of the mould in correspondence with a cylindrical collector of little width that communicates it with the outside. This collector, unlike other previously known solutions, has a much reduced width due to the existence, in this case, of a considerably fewer number of orifices.

The blank pipe which is introduced in the mould, through one of the ends, internally rests on the exterior generatrix of the guide it being inscribed in the blank pipe, and is introduced longitudinally and without the possibility of error until the bottom of the mould to subsequently carry out the securing of the first head or intake and outlet head of the mould. The blank pipe enters hot at a temperature which permits its orientation on being deformed, without any heat exchange occurring between the pipe and the wall of the mould during the expansion of the blank pipe, for which reason there is no temperature variation in the blank pipe.

The pipe production method using this apparatus is based on the following operational phases:

Introduction of the blank pipe inside the mould through the small opening defined in the first head, said blank pipe previously heated in a dry heating apparatus, without moisture, at the same temperature as the mould to avoid heat exchange between the blank pipe and the wall of the mould, and to substantially improve processing times, fundamentally compared to the second method cited in the previous section, which heats the blank pipe in the mould. The introduction is carried out so that it includes the inner guide, which is confined within said blank pipe, the guide therefore serving as reference to avoid deformations or folds that may arise, since the blank pipe is in plastic and deformable state.

Closure of the opening of the head corresponding to the end of the mould whereby the blank pipe has been introduced and actuation of the means of securing of the blank pipe, so that it is perfectly fixed and immobilized inside the mould.

Execution of the vacuum in the enclosure limited by the interior of the mould and the exterior of the blank pipe.

Application, through a pumping system or pressurized tank, of an expansion fluid towards the interior of the blank pipe, always at the same temperature as it, to produce the expansion thereof against the walls of the mould. The fluid is applied through the second head or head opposite that of the intake/outlet of the pipe and the fluid accesses the interior of the plastic blank through the orifices defined in the guide, with suitable distribution so that the expansion occurs in controlled form.

Application to the interior of the expanded plastic pipe of a cooling fluid, preferably by a pumping system, or pressurized tank, and simultaneous outlet of the fluid to permit the continual flow of said cooling fluid and its direct interaction against the inner walls of the expanded pipe, always maintaining an interior pressure which prevents the retraction of the plastic towards its initial form. The application of this cooling fluid occurs regularly and in controlled manner through the orifices of the guide, with orifices conveniently distributed which allow a regular and efficient incidence of the pipe of the inner surface of the mould. Simultaneously and making use of the natural contractions of the plastic by cooling, a laminar current between the inner walls of the mould and the formed pipe could be caused, of cooling fluid which would accelerate the cooling process, introducing said fluid through bores defined for said purpose in the mould.

Depressurization and/or emptying of the interior of the oriented pipe, once it is cooled, connecting the interior of said oriented pipe with the environment, or with an accumulator tank.

Opening of the first head in its maximum dimension and application of a lubricant fluid which is injected by pressure by the second head and/or collector to achieve the fast and efficient extraction of the oriented pipe, that pressurized introduction or injection of the lubricant fluid causing a cushion effect between the mould and the oriented pipe to reduce the extraction forces.

It is preferably considered that the expansion fluid and/or the cooling fluid and/or the lubricant fluid are gases.

DESCRIPTION OF THE DRAWINGS

To complete the description being made and with the object of helping towards a better understanding of the characteristics of the invention, in accordance with a preferred example of practical embodiment thereof, a set of drawings is attached as an integral part of said description wherein, with illustrative and non-limitative character, the following has been represented:

FIG. 2. Shows a view of the sequence of the phases of the manufacturing process.

PREFERRED EMBODIMENT OF THE INVENTION

Figure 1:
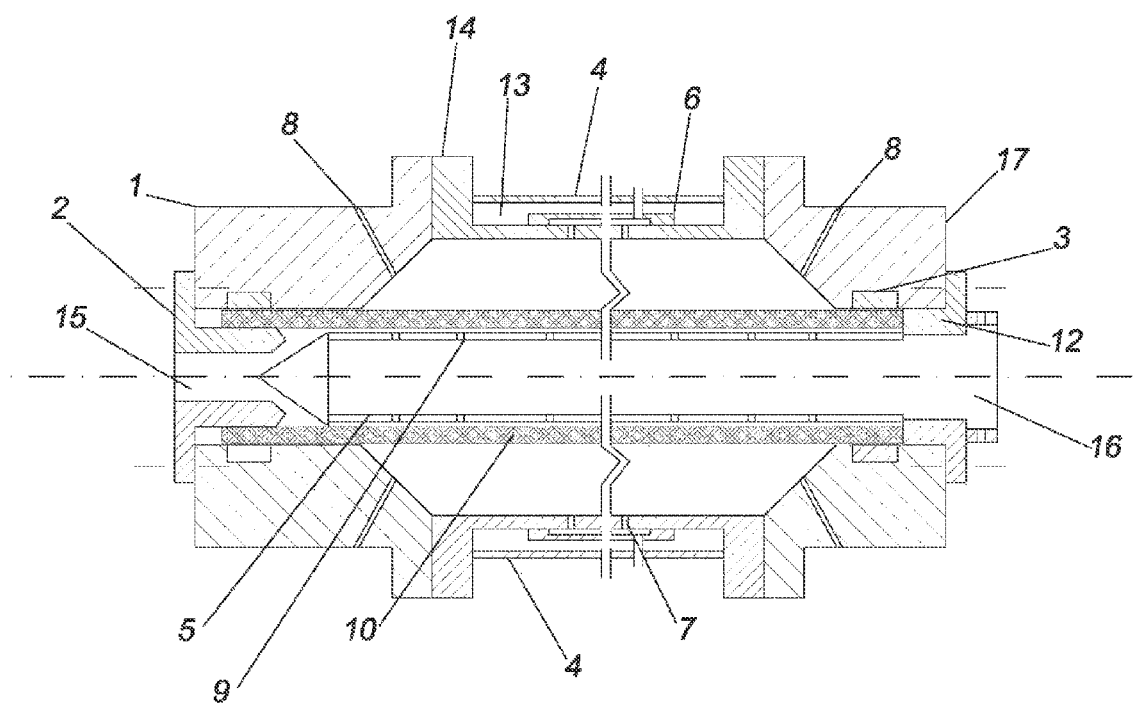
FIG. 1. Shows a longitudinal sectional view of the apparatus for the manufacturing of molecularly bi-oriented pipes or tubular profiles.

As can be seen in said FIG. 1, the apparatus of the invention comprises a complete mould, formed by a first head (1), a second head (17), and a central body (14) associated by their ends to said heads (1, 17). In these heads (1, 17) means of securing (3) are disposed that fix the position of the blank pipe (10), as well as orifices (8) being made therein which allow the communication of the interior of the mould (1, 17, 14) with the exterior, to apply pressure or vacuum equally. The first head (1) has a sealing bushing (2) of reduced dimensions which is coupled in axial direction on one of the ends of the blank pipe (10), and the second head (17) has a support bushing (16).

FIG. 1 also shows that the apparatus incorporates a rigid perforated guide (5), axially centred inside the mould (1, 17, 14), provided with orifices (9), which is fixed by one its ends to the support bushing (16) and is prolonged internally between the heads (1, 17) and the central body (14).

The apparatus also has a tempering chamber (13) confined between a sleeve (4) and the outer surface of the central body (14). In the central body (14) bores (7) are defined which communicate the interior of the mould (1, 17, 14) with the exterior through a collector (6).

To form the oriented pipe (10') from the blank pipe (10) a process is followed which occurs according to the following steps:

a) STEP 1. As is observed in FIG. 2.1, the blank pipe (10) is introduced through the first head (1), after removing the sealing bushing (2), until said blank pipe (10) reaches the second head (17), to later close the first head (1) with the sealing bushing (2) and actuate the means of securing (3) which secure the blank pipe (10) at both ends. As is observed in FIG. 2.1 the blank pipe (10) is introduced in longitudinal direction externally fitted on the perforated guide (5), whose outer diameter is slightly less than the inner diameter of the blank pipe (10). So as not to modify the temperature of the blank pipe (10), the perforated guide (5) may have been previously heated by means of the passage of hot fluid or by means of internal circuits defined for that purpose, not graphically represented.

b) STEP 2. Next, as observed in FIG. 2.2, an expansion fluid (18) enters through a central opening (16) defined in the support bushing (12) and is guided through the interior of the perforated guide (5) to then exit uniformly distributed through the orifices (9) thereof, causing the expansion of the blank pipe (10) which reaches the inner walls of the mould (1, 17, 14) adopting the geometry thereof.

Simultaneously and as support measure to avoid accumulations of air between the mould (1, 17, 14) and the blank pipe (10) a vacuum is made in the chamber created between both through the orifices (8) open in the heads, and through the bores (7) and of the collector (6).

c) STEP 3: Once the pipe is expanded, as observed in FIG. 2.3, a cooling fluid (19) is introduced through the central opening (16) of the support bushing (12) which penetrates the guide (5), then being projected uniformly through its orifices (9) on the inner walls of the already expanded pipe or oriented pipe (10'). So that there is circulation and that there is a continual passage of cooling fluid, it will communicate with the exterior by the bushing (15), previously regulating the outlet pressure. In this way an inlet and outlet current of cooling fluid is created whose heat exchange with the oriented pipe (10') produces a cooling therein.

This direct cooling supposes a very considerable difference with the aforementioned inventions, since this direct cooling is much more efficient in terms of processing times and efficiency of the cooling fluid. Additionally, and to improve the speed of the process, another cooling current could be provoked between the outer walls of the oriented pipe (10') and the mould (1, 17, 14) by the intake and outlet of cooling fluid through the orifices (8) and bores (7).

d) STEP 4: After a cooling time, sufficient so that the oriented pipe (10') has passed from plastic state to solid state, the first head (1) whereby the blank pipe (10) was introduced is displaced, as observed in FIG. 2.4 to remove the oriented pipe (10') and repeat the cycle.

Additionally by the introduction of lubricant fluid (20) through the orifices (8) and bores (7), it is possible to facilitate the extraction of the oriented pipe (10') creating a sheet of fluid between the mould (1, 17, 14) and the oriented pipe (10'), which supposes another important advance in speed and ease of extraction with respect to previous inventions.

The invention claimed is:

1. Apparatus for the production of molecularly bi-oriented plastic pipes, comprising:

a mould whereby an oriented pipe is produced from a blank pipe by expansion, said mould is formed by a central body, a first head and a second head connected on opposite sides of the central body;

a rigid and perforated guide, which is axially centred inside the mould, said guide being extended between the heads and the central body, which has an outer diameter slightly less than the inner diameter of the blank pipe for the longitudinal coupling thereof on the guide, and which is provided with orifices adapted for the passage therethrough of an expansion fluid which causes the expansion of the blank pipe against the inner walls of the mould;

a tempering chamber confined between a sleeve and the outer surface of the central body;

bores, connecting said central body with the exterior through a collector adapted to apply the vacuum;

orifices in said heads, which communicate the interior of the mould with the exterior and which are adapted to apply vacuum, to introduce lubricant fluid or cooling fluid;

a pumping system connected to the interior of the expanded plastic pipe through the orifices of the guide and adapted to apply cooling fluid through the orifices of the guide;

wherein the bores are adapted to introduce lubricant fluid or cooling fluid, and wherein the apparatus further comprises a support bushing coupled to the second head whereto is fixed one of the ends of the guide, which is provided with an opening adapted for the intake of expansion fluid and/or cooling fluid towards the interior of the guide.

2. Apparatus for the production of molecularly bi-oriented plastic pipes, comprising:

a mould whereby an oriented pipe is produced from a blank pipe by expansion, said mould is formed by a central body, a first head and a second head connected on opposite sides of the central body;

a rigid and perforated guide, which is axially centred inside the mould, said guide being extended between the heads and the central body, which has an outer diameter slightly less than the inner diameter of the blank pipe for the longitudinal coupling thereof on the guide, and which is provided with orifices adapted for the passage therethrough of an expansion fluid which causes the expansion of the blank pipe against the inner walls of the mould;

a tempering chamber confined between a sleeve and the outer surface of the central body;

bores, connecting said central body with the exterior through a collector adapted to apply the vacuum;

orifices in said heads, which communicate the interior of the mould with the exterior and which are adapted to apply vacuum, to introduce lubricant fluid or cooling fluid;

a pumping system connected to the interior of the expanded plastic pipe through the orifices of the guide and adapted to apply cooling fluid through the orifices of the guide;

wherein the bores are adapted to introduce lubricant fluid or cooling fluid, and wherein the first head has a sealing bushing of reduced dimensions which can be coupled in axial direction on one of the ends of the blank pipe once introduced in the mould.

3. Apparatus for the production of molecularly bi-oriented plastic pipes, comprising:

a mould whereby an oriented pipe is produced from a blank pipe by expansion, said mould is formed by a central body, a first head and a second head connected on opposite sides of the central body;

a rigid and perforated guide, which is axially centred inside the mould, said guide being extended between the heads and the central body, which has an outer diameter slightly less than the inner diameter of the blank pipe for the longitudinal coupling thereof on the guide, and which is provided with orifices adapted for the passage therethrough of an expansion fluid which causes the expansion of the blank pipe against the inner walls of the mould;

a tempering chamber confined between a sleeve and the outer surface of the central body;

bores, connecting said central body with the exterior through a collector adapted to apply the vacuum;

orifices in said heads, which communicate the interior of the mould with the exterior and which are adapted to apply vacuum, to introduce lubricant fluid or cooling fluid;

a pumping system connected to the interior of the expanded plastic pipe through the orifices of the guide and adapted to apply cooling fluid through the orifices of the guide;

wherein the bores are adapted to introduce lubricant fluid or cooling fluid, and wherein the heads have means of securing of the blank pipe.

4. Apparatus for the production of molecularly bi-oriented plastic pipes, comprising:

a mould whereby an oriented pipe is produced from a blank pipe by expansion, said mould is formed by a central body, a first head and a second head connected on opposite sides of the central body;

a rigid and perforated guide, which is axially centred inside the mould, said guide being extended between the heads and the central body, which has an outer diameter slightly less than the inner diameter of the blank pipe for the longitudinal coupling thereof on the guide, and which is provided with orifices adapted for the passage therethrough of an expansion fluid which causes the expansion of the blank pipe against the inner walls of the mould;

a tempering chamber confined between a sleeve and the outer surface of the central body;

bores, connecting said central body with the exterior through a collector adapted to apply the vacuum;

orifices in said heads, which communicate the interior of the mould with the exterior and which are adapted to apply vacuum, to introduce lubricant fluid or cooling fluid;

a pumping system connected to the interior of the expanded plastic pipe through the orifices of the guide and adapted to apply cooling fluid through the orifices of the guide;

wherein the bores are adapted to introduce lubricant fluid or cooling fluid, and wherein the first head has opposite openings of different size, wherein the smaller opening is adapted to allow the introduction of the blank pipe and the larger opening is adapted to facilitate the extraction of the oriented pipe when the first head moves with respect to the central body.

* * * * *